Sept. 24, 1968

A. C. DAMAN 3,402,896

PORTABLE ORE MILLING PLANT

Filed July 5, 1966

INVENTOR.
ARTHUR C. DAMAN
BY

ATTORNEYS

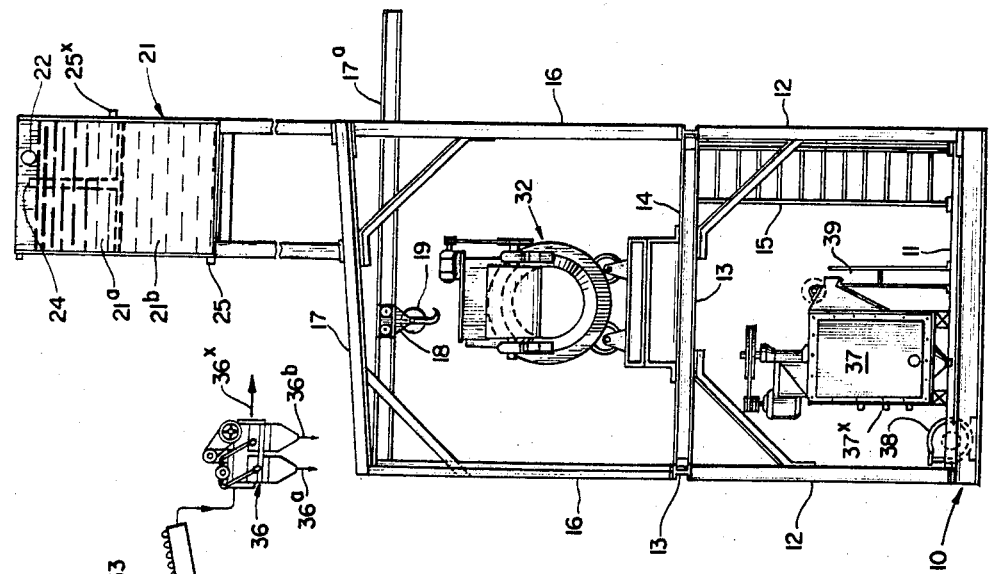
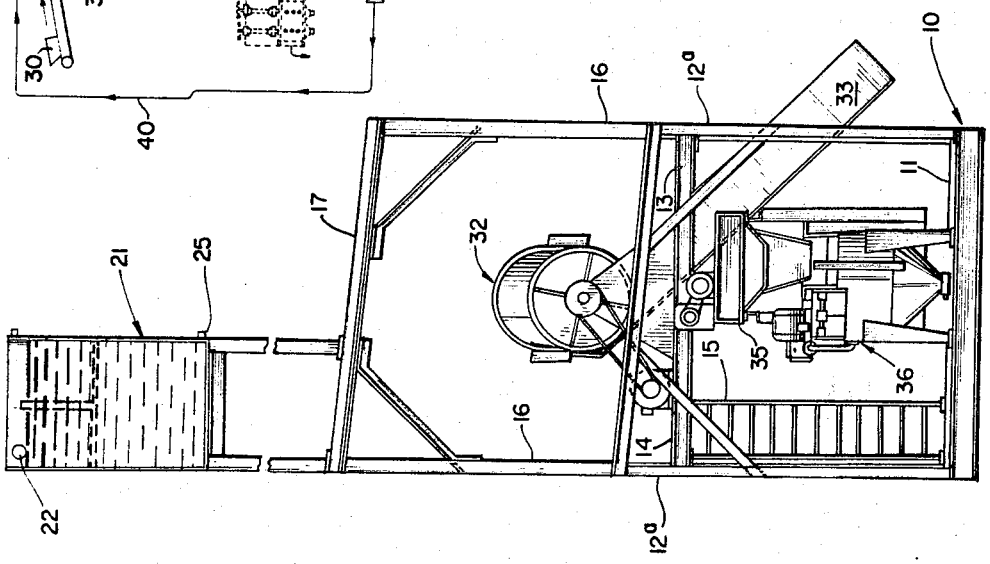

United States Patent Office 3,402,896
Patented Sept. 24, 1968

3,402,896
PORTABLE ORE MILLING PLANT
Arthur C. Daman, Denver, Colo., assignor to Denver Equipment Company, Denver, Colo., a corporation of Colorado
Filed July 5, 1966, Ser. No. 562,588
3 Claims. (Cl. 241—38)

ABSTRACT OF THE DISCLOSURE

Portable ore milling plant transportable as unitary assembly having two floor levels above base and compartmented water supply above upper floor, circuit includes combined reduction mill and screening assembly on upper floor with hinged feed conveyor extending outwardly from end of combined assembly for reception of raw ore feed at selected elevations above base level. Classifier on lower floor receives gravity-flow scrubbed ore discharge from combined assembly and feeds underflow to jigging and overflow to flotation concentration stages on lower floor by gravity. Water input into upper compartment of water supply with excess overflowing into lower compartment. Constant head discharge of water from upper compartment by gravity to jigging. All other water input into circuit from fluctuating level lower compartment by gravity flow.

---

Figure 1:
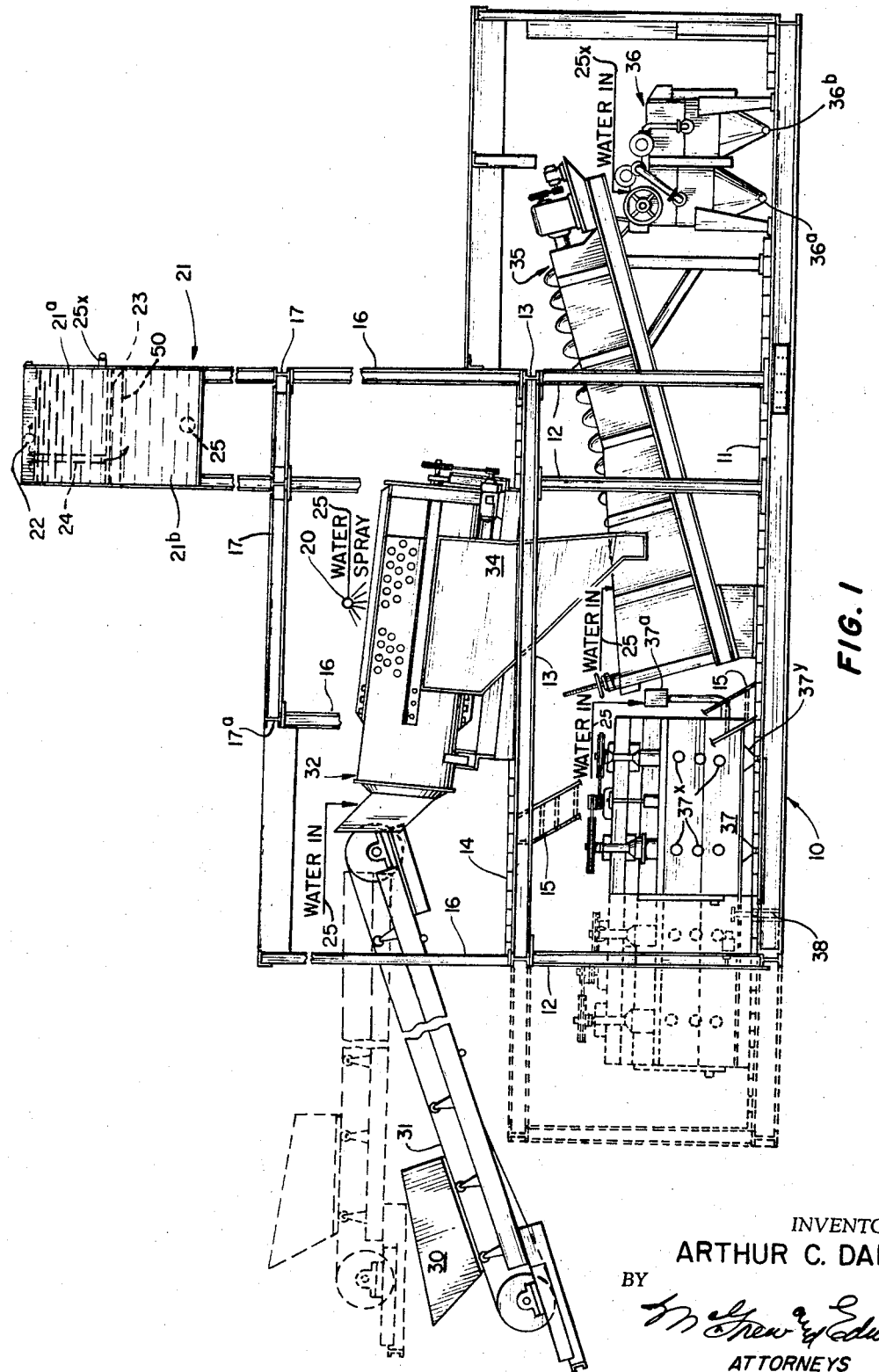

This invention relates to a system or plant for concentration of minerals in mixed sizes, and more particularly relates to such a plant that is assembled as a portable unit.

In many mineralized mining districts in which mining activity has terminated or has been curtailed without exhausting all available ore, there usually are ore dumps remaining at the sites of earlier operations which have substantial mineral content from which the original high grade content was removed but were not worked for recovery of lower grade material.

In addition, new discoveries are being made from time to time in areas where it is difficult or impossible to determine the likelihood of economical commercial milling of the newly discovered ore body except at prohibitive costs. Usually the mine dumps having ore of commercial grade, and the newly discovered ore bodies have no custom milling facilities available, and consequently the owners of such minerals have to provide their own facilities for milling the ores.

As even small capacity mills are constructed as permanent or substantially permanent installations, their only actual value when the milling operation terminates is the scrap value of the equipment that can be removed and sold as used equipment. Consequently many properties that might be worked economically are passed by because of the capital expense required to initiate operation and the risk of substantial loss.

It is an object of my invention to provide a durable, economical and efficient concentrating plant which is portable and may be moved to different operating locations by conventional transportation facilities without impairing the operating efficiency of the plant.

Another object of my invention is to provide a simple, economical and efficient ore milling plant which utilizes all gravity flow except for the original ore feed and the pumping of one low-volume recirculating flow in the circuit.

A further object of my invention is the provision of an integrated ore milling plant providing gravity flow of a plurality of feeds of ore in graded sizes to concentrating apparatus best suited for efficient concentration of the ore fraction in the size range fed to each concentrator.

Other objects reside in novel details of construction and novel combinations and arrangements of parts, all of which will be set forth in the course of the following description.

The practice of my invention will be described with reference to the accompanying drawings. In the drawings, in the several views of which like parts bear similar reference numerals, FIG. 1 is a front elevation of a portable ore milling plant according to my invention providing gravity flow from the point of feed introduction to the final product discharge, except for one recirculating flow, FIG. 2 is an end elevation of the plant shown in FIG. 1, viewed from the discharge end, FIG. 3 is another end elevation of the plant shown in FIG. 1, viewed from the feed end, and FIG. 4 is a flow sheet showing the circuiting arrangement of the plant shown in FIG. 1.

The portable plant illustrated in FIG. 1 has a base 10 of structural members and suitable flooring providing a lower deck 11 on which equipment is mounted and personnel can walk in going from one piece of equipment to another. A series of uprights or columns 12 are attached to base 10 as by removable fasteners (not shown) and beams 13 interconnect the tops of the uprights 12 to form a second upper deck 14 on which flooring is placed to support equipment and provide a walkway for operators of the plant. A stairway 15 provides access between decks 11 and 14.

The righthand end of the plant as viewed in FIG. 1 requires a higher ceiling for lower deck 11 because of the elevation of an end of a spiral classifier requiring more headroom. Consequently, end uprights 12a are longer than uprights 12. Another set of uprights 16 alined with uprights 12 are interconnected by beams 17 to provide a ceiling for upper deck 14. One beam 17a is horizontally disposed and a dolly 18 carrying sheaves 19 travels on beam 17a and provides a hoist assembly for use in the service and repair of plant equipment. The uprights 16 nearest end uprights 12a provide support for the higher ceiling structure aforementioned.

Preferably, a water tower structure 21 will be mounted on beams 17 which has a filling opening 22 at its top for connection with a suitable source of supply (not shown). A diaphragm 23 divides the interior of the reservoir portion of the tower into an upper compartment 21a which provides a constant head discharge through an outlet 25x and a lower compartment 21b and a stand pipe 24 receive the excess water input through inlet 22 thereby providing a fluctuating level in compartment 21b as indicated at 50 in FIG. 1. The water input through inlet 22 exceeds the retention capacity of compartment 21a at the established withdrawal rate through outlet 25x and keeps upper compartment 21a filled during periods of water withdrawal from a lower outlet 25 in compartment 21b (FIGS. 2 and 3). A line having suitable valve controlled branches (not shown) will deliver water as required to various input points all designated 25 in FIG. 1, such as the intake to a screen, a classifier, or the feed inlet of one or a plurality of flotation cells operating in the plant circuit as will be described hereinafter. A duplex jig in the circuit is supplied by water from an upper outlet 25x in compartment 21a which is kept filled to maintain a constant head at all times as the jig requires water at a constant pressure.

The plant structure just described will be transported in at least a partially knock-down condition to the site of its use and will be set down on suitable footings at the operating site. Structural members disassembled for transport can be secured on upper and lower decks 14 and 11 during transport and mounted in operating position after the base 10 is seated on the footings. The uprights and beams preferably are secured by bolting so as to permit easy disassembly of components when the plant assembly is to be moved to another operating site.

The arrangement of equipment in the plant circuit has been depicted in the flow sheet FIG. 4 which is a typical circuiting arrangement when working dump ores for example. As shown, dump ore is fed into the intake hopper 30 of a feed conveyor 31 which deposits the feed on the conveyor in substantially uniform increments. Oversize rock and tramp material may be removed by hand picking at the conveyor, which may be any suitable type, here shown as an endless belt conveyor. The remaining ore which may have been previously milled will receive suitable size reduction in the plant circuit. The upper or discharge end of the conveyor preferably has a pivotal mounting permitting it to be swung from a horizontal position as shown in dash lines in FIG. 1 to an inclined position in which the hopper may be filled from dump trucks or mine cars, or from a transport conveyor supported at ground level.

The conveyor 31 discharges into a compartmented trommel screen 32, the upstream compartment of which functions as a grinding mill and may contain a charge of balls or rods as grinding media. Such a screen is sold commercially by Denver Equipment Company, assignee of this application, and detailed description of same appears unnecessary. An intermediate section of the mill has a perforated or foraminous periphery, the openings of which are of a size to pass the desired particle sizes for material going to the concentration. The downstream end of screen 32 has an end opening or passage for discharge of screen reject material which is discharged to a side of the plant as waste as shown at 33 in the flow sheet.

The screened product is collected at 34 and delivered as feed to a spiral classifier 35. Water from water tower 21 usually is introduced into the feed end of screen 32 through a branch of line 25 to establish a desired pulp ratio for the size reduction treatment and most of the water input to screen 32 drains with the screened product passing to the classifier. A lesser quantity of water discharges with the reject product at 33 and passes to waste. Consequently, some water addition may be required for proper pulp ratio at classification and water from reservoir 21 may be introduced into classifier 35 by another branch of line 25 as indicated in FIG. 1. Water also is used to assist the screening action and as shown in FIG. 1 a spray nozzle 20 supplied by a branch of line 25 may be located inside or outside screen 32 to spray solids on the screen surfaces and accelerate discharge.

The raked product of classifier 35 contains a coarse fraction which cannot be effectively concentrated by froth flotation without further size reduction and this material is introduced into a jigging treatment preferably using a duplex jig 36 such as the duplex jig of Denver Equipment Company which collects concentrate in the hutch portion and discharges gangue as a waste product. The concentrate in the hutch portion discharges at 36a and 36b. The classifier overflow is a product in the flotation size range and discharges directly into the feed inlet 37a of a single or multi-cell flotation machine 37. As shown in FIGS. 1 and 3, the flotation machine preferably is a multi-cell type having a compartment or cone 37y beneath the impeller into which middlings are directed by the sweep of the impeller and subjected to a concentration by displacement effect. Such a machine is shown and described in U.S. Patent No. 3,098,818 owned by the present assignee.

In addition, cells 37 have normally closed outlets 37x at spaced elevations for withdrawal of middlings material tending to float but not carrying into the froth. Middling material is selectively withdrawn from one or more outlets 37x and cone 37y and delivered into the intake of a pump 38. The froth concentrate of cell 37 is discharged as a final product at 39. The withdrawn middlings are pumped through a line 40 to the intake of screen 32 and subjected to further size reduction in the grinding compartment therein.

The classifier overflow discharge delivered to flotation may be introduced into a conditioner tank (not shown) for mixing with reagents before introduction into feed inlet 37a. If a changed pulp ratio is required for flotation, water from reservoir 21 also may be delivered to the conditioner or inlet 37a through a branch of line 25. The multi-cell flotation machine is shown in FIG. 1 as a two-cell machine, but the dash lines show how additional cells may be provided and the machine may have any number of cells required for complete concentration of the flotation fraction.

The water line and branches from water tower 21 to various introduction points have not been shown in FIGS. 1, 2 and 3 as they would obscure other apparatus but are represented by "water in" designations as branches of line 25, and the flow sheet FIG. 4 is the only showing of the recirculation flow from pump 38 to screen 32, which is considered ample disclosure of an operative arrangement. Also, for convenience in illustration the structural framework is shown as open on the sides and ends, but it will be preferable to have a curtain wall covering of any suitable material.

FIGS. 1, 2 and 3 illustrate electric motors for driving the equipment illustrated as the plant usually will be operated where a power line is accessible. In remote locations, a portable diesel unit may be used to generate power for plant operation and its waste heat may be used to heat the plant building. A water source usually is available at the mine site and will be used to supply tower 21. If the available water cannot be delivered to the tower by gravity flow, it will be pumped in at a rate required to keep the reservoir filled.

In the preceding specification, preferred types of equipment have been described and illustrated in the drawings. It will be understood that any equipment capable of performing the required functions may be utilized and other changes and modifications may be availed of within the spirit and scope of the hereunto appended claims.

What I claim is:

1. A portable ore milling plant comprising a base assembly, inclusive of a lower floor or deck portion, upright supports on the lower floor, beams interconnecting the top portions of adjoining upright supports and providing an upper floor or deck, a combined reduction mill and trommel screen assembly supported on said upper deck and including an ore reduction compartment at its upstream end, an intermediate screening section and a discharge for oversize at its downstream end, conveyor means having a discharge end hinged adjacent the combined assembly and a receiving end adapted to receive sized ore to be treated for delivery into said reduction compartment, means for discharging screened oversize from the oversize discharge by gravity, a reservoir for water mounted on support structure extending from the upper deck to an elevation substantially above the combined assembly, said reservoir having its interior divided into an upper constant head compartment and a lower fluctuating level compartment, and first conduit means for delivering excess water input of the upper compartment into the lower compartment, a mechanical classifier on the lower deck arranged to receive screened undersize from the screening section by gravity, a duplex jig on the lower deck arranged to receive the raked product of the classifier by gravity, at least one flotation cell on the lower deck arranged to receive the classifier overflow by gravity, said cell having outlets for withdrawal of middlings from its bottom and from at least one level above its bottom, a single pump in the plant circuit for delivering a selected middlings product from the flotation cell as a feed to the reduction compartment, supply conduit means for delivering water continuously into the upper compartment of the reservoir in a quantity exceeding its storage capacity so as to supply excess water through the first conduit means into the lower compartment, second conduit means for delivery of water at constant pressure from the upper compartment into the jig by gravity, and other conduit means for delivering water from the lower compartment to the combined assembly, the classifier and the flotation cell by gravity.

2. A milling plant as defined in claim 1, in which the first conduit means is a standpipe having its intake in an upper portion of the upper compartment, and the second conduit means has its intake at the bottom of said upper compartment.

3. A milling plant as defined in claim 1, in which said other conduit means delivers spray water to said screening section.

References Cited

UNITED STATES PATENTS

| | | | |
|---|---|---|---|
| 1,434,386 | 11/1922 | Hilleke | 209—44 X |
| 1,645,603 | 10/1927 | Loftus | 209—44 X |
| 2,050,458 | 8/1936 | Ovestrud | 209—44 X |
| 2,366,222 | 1/1945 | Tocci-Guilbert | 209—44 |
| 2,441,584 | 5/1948 | McNeill | 209—12 X |
| 2,654,479 | 10/1953 | Driessen | 209—211 X |
| 3,098,818 | 7/1963 | Damon | 209—169 |

FRANK W. LUTTER, *Primary Examiner.*